UNITED STATES PATENT OFFICE.

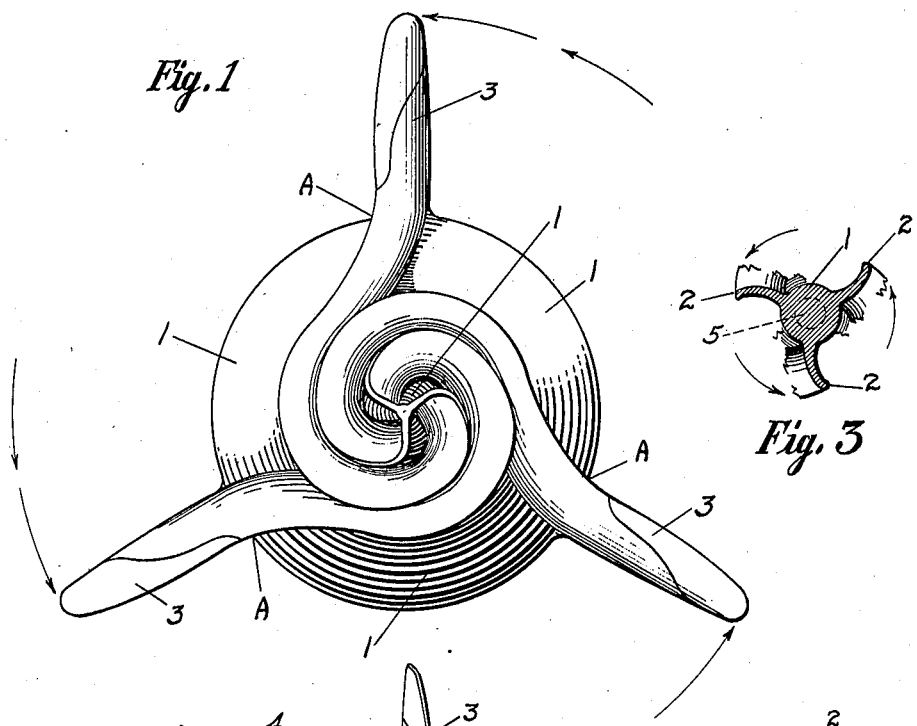
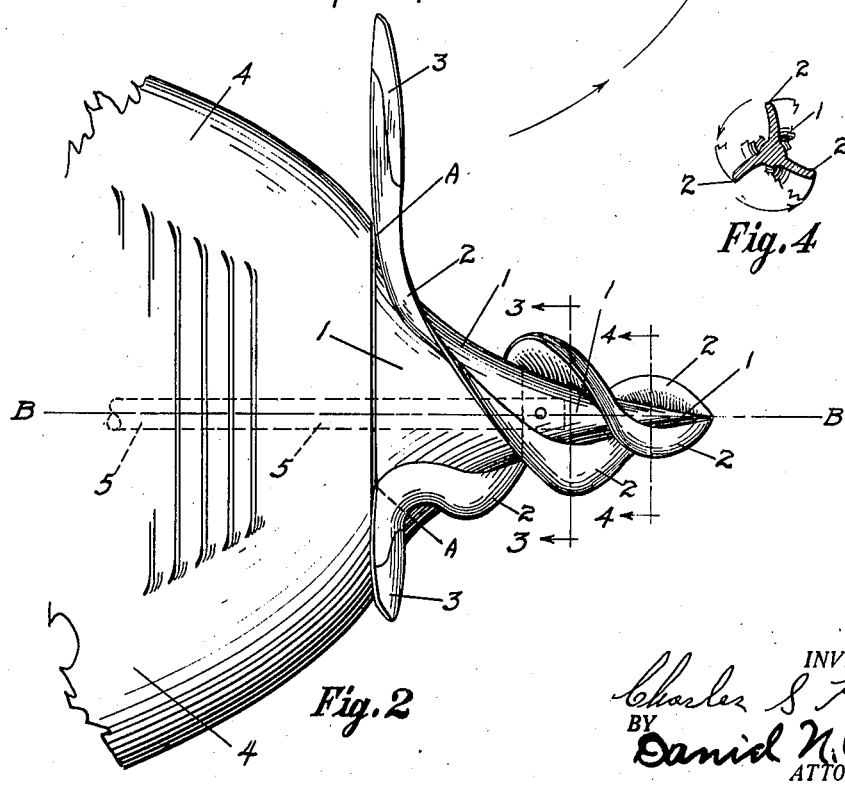

CHARLES S. HALL, OF LOS ANGELES, CALIFORNIA.

AIRCRAFT PROPELLER.

1,420,313.  Specification of Letters Patent.  Patented June 20, 1922.

Application filed December 13, 1921. Serial No. 522,020.

*To all whom it may concern:*

Be it known that I, CHARLES S. HALL, a citizen of the United States of America, a resident of Los Angeles, in the county of Los Angeles, State of California, have invented a new and useful Improvement in Aircraft Propellers, of which the following, when read with reference to the accompanying drawings, is such a full, clear, and exact specification embodying the invention in its preferred form as will enable others skilled in the art to which it appertains to make and use the same.

My invention relates to an improvement in aircraft propellers and has for one of its objects to provide a means of greatly reducing, if not entirely eliminating, the head resistance, found near and around the axis of other and ordinary types of aircraft propellers, by providing, as herein shown, a cone shaped center (hereinafter called cone) having a profile of opposing catenary lines of increasing accentuations away from the longitudinal axis as the said lines approach toward, and finally terminate at, the base of the said cone, while the apex thereof is disposed in the direction of the passage of the propeller through the air, whereby the air-stream impinging upon the said cone will be gradually diverted away from the said axis as it follows backwardly along the surface of the said cone until it finally slips away from the said cone at the base thereof and within the path of the blade of the propeller extending beyond the said base.

Another object is to provide a means, conjointly with the said cone, for the gradual taking hold upon the air-stream impinging on the surface of the said cone by providing, on the contour thereof and integrally therewith, spirally receding vanes having their geneses forward of the apex of the said cone and coinciding on the same longitudinal axis and from thence spirally retrograding upon and finally terminating at the conic base and thereat making a conjunction with, as well as an ultimate ending on, the propeller blades, and during all of the stages of these vaneous retrogressions there is a gradual decrease of the angle of incidence thereof with respect to the surface of the said cone and a concomitant increase in the angle of deflection with respect to the said longitudinal axis until the said vanes conjoin with and merge into the propeller blades, whereby there will be a gradual and progressive taking hold upon the air-stream as there is a gradual and compensatory acceleration of the angular velocity of the said air-stream concomitantly with the increase of the peripheral velocity of the said cone, thus producing the greatest efficiency from, as well as a complete utilization of, the air-stream coming within the conic area of the propeller and impinging thereon, and moreover, as the said air-stream is expelled from the conic base with an angular and tangential velocity it will increase the compression of as well as the amount of air in the line of the propeller blades and by reason thereof the thrust derived therefrom will be correspondingly increased.

Another object afforded by my invention is the expelling of the conic air-stream into the path of the propeller blades at a point where there is the greatest peripheral velocity and where the pitch of the propeller blades may be of the highest efficiency commensurate with the forward velocity of the propeller through the air as well as with the power of the engine required to produce this forward velocity by means of the rotation of the said propeller regardless of the variations of atmospheric pressure and density according to altitude.

A further object is to provide great strength of the propeller as a whole to withstand both the gyrational and thrust strain incident to high peripheral velocities by having the cone shaped axis which permits a wide range of internal constructive variations by which the weight involved therein may be decreased and the strength thereof increased.

Up to the existing state of the art it has been found both difficult and impractical, if not impossible, to ornithopterally secure, by mechanical means, any sufficient propelling effort in aircraft, and as a result, rotary propellers are in accepted and common use. But the existing types of propellers involve a compromise between the head resistances found at and near the axis thereof, due to the quantity of material necessarily used thereat in order to provide sufficient strength to withstand both the gyrational and thrust strains exerted thereon at high velocities, as compared with the efficiency acquired relatively near the peripheral motion of the said propeller blades. Since heretofore there has not been evolved a means of efficiently stream-lining the structural part of the propeller near the axis, there remains an area described around the said axis wherein there is a constant head resistance as the propeller moves through the air. This head resistance is varied directly with the square of the velocity of forward motion, and since the increased peripheral velocity involves increased thrust and gyrational strains which strains require a corresponding increase in the quantity of material necessary to reinforce the axillary strain, and as the area described by the diameter of the propeller remains constant, the increased head resistance above described necessarily involves a concomitant decrease in the efficiency of the propeller as a whole and there is ultimately and rapidly reached a maximum thrust produced by the propeller, regardless of the power of the engine, involving a given forward velocity of the aircraft through the air. As this maximum thrust is produced and the forward velocity acquired the efficiency is rapidly decreased as the forward velocity is increased and the power of the engine so expended is actually wasted beyond the maximum of efficiency. Hence there has heretofore existed no direct relation between the power expended and the thrust and efficiency produced thereby. Now the purpose of the present invention is to overcome these difficulties as well as to produce an actual thrust from the airstream falling within this axillary area otherwise offering a head resistance and also a purpose to maintain a constant aeriformous ratio of thrust commensurate with the power expended at all peripherial velocities, in all atmospheric densities and at all altitudes.

Having thus briefly enumerated the objects of my invention, I will now describe the same with reference to the accompanying drawings and the indicating numerals found thereon, all of which form an essential part of this specification.

Figure 1, is a view of the propeller taken directly in front of the same and on a line of the longitudinal axis showing the spirally retrogressing vane backwardly extending from the apex and radially progressing away from the longitudinal axis by following along the surface of the central cone, finally merging into, and becoming an integral part of, the propeller blades.

Figure 2, is a side view of the propeller, showing a fragmented portion of the hull of the aircraft in which the said propeller is operatively journalled and arranged, and further showing the relative position of the said spiral vanes upon the central cone, as well as showing the profile catenary lines in opposition across the longitudinal axis.

Figure 3, is a cross sectional view taken on the transverse axis on line 3—3, shown in Figure 2, showing the relative position as well as the angle of incidence of the spiral vanes.

Figure 4, is a cross sectional view taken on the transverse axis on line 4—4, shown in Figure 2, showing the relative position and angle of deflection of the spiral vanes at this particular point.

In carrying out my invention in its preferred form, as illustrated in the accompanying drawings, a cone shaped center portion 1 (hereinafter called the cone), is provided, having a forward apex coincident with the propeller axis and having a catenary profile of opposite curvature, as shown in Figure 2, of a gradually increasing declination towards a radial line extending at right angles from the axillary center at the base of the said cone and finally terminating at an oblique angle, on the line of the radius at the conic base, as shown in Figure 2 in side view and in Figure 1 in front view. On this cone 1 are built a series of spiral vanes 2 of gradually increasing angle of incidence as the said vanes retrogress away from the apex and progress outwardly from the axillary center of the said cone, finally merging into and becoming integral with the propeller blades 3 at the juncture of the conic base and the blade at position "A", as shown in various positions in Figures 1 and 2.

The assembled propeller is held in rotatable position in the aircraft body 4 upon shaft 5, indicated by dotted lines in Figure 2, journalled within the aircraft and operatively arranged with the engine by any suitable means.

Now in operation as the propeller is rotated in the direction indicated by the arrows in Figure 1, the propeller blades 3 will induce an air-stream to pass backwardly covering the entire area described by the radial reach of propeller blades 3 and will induce a central air-stream to impinge upon the cone 1 and on and between the vanes 2 until the said air-stream, so impinging, is diverted by backward and outward motions and impelled at and around the base of the cone in the path of the propeller blades 3 and particularly in front of the juncture of the vanes and blades at position "A," as shown in Figures 1 and 2. Attention is called to the fact that the spiral vanes, from the apex to the base of the cone, so gradually change their angle of incidence with respect to the radial lines from the longitudinal axis as they retrogress backwardly from the apex and progress outwardly from the radial center as will enable them to pass through the air-stream in such a manner that they will gradually take into and hold the air-stream according to their distance from the axillar center and according to the relative peripheral velocity acquired by the said vanes on the said cone at any given point along the contour thereof. Hence it will be seen that along this entire contour of the cone there will be a gradual increase in the compression of the air-stream and a concomitant increase in the angle of incidence of the spiral vanes so as to thereby derive a gradually increasing thrust from the said air-stream until the same is impelled by an angular velocity at the base of the said cone. At this point there is increased compression of the air-stream so that the extending propeller blades may secure a further and an additional thrust therefrom, a thrust also augmented by reason of the angular velocity; thus securing the maximum quantity of air induced at the point of highest compression in the line of the air-stream and in the path of the propeller blades whereby the greatest possible thrust may be derived therefrom on the most efficient pitch line.

Moreover it will be seen that at all speeds of the said propeller, the spirally receding and axially progressive vanes bear a constant relation to the peripheral velocities of the conic base as well as to the pitch of the extending propeller blades whereby the said vanes will at all times and at all angles maintain such constant relation as well as a constant, resulting and corresponding efficiency.

It will of course be understood that the number of spiral vanes may be increased or decreased in any suitable manner and in any suitable numbers in order that the gyrational equipoise might be maintained. Also that their angles of incidence may be arranged so as to become aeriformous with any desirable pitch line of the propeller blades at any predetermined peripheral velocity commensurate with the engine power devoted to the rotation thereof. Various other changes may be made in the relative shape, size, angle, arrangement, and collocation, of the said vanes and blades as well as in relation to the said cone and to each other so as to obtain the most satisfactory aeriformous benefits in various forms of adaptation and uses to which the same may be placed without departing from the spirit of this invention.

Attention is called to the fact that the reverse lines in profile of coneshaped hub as here shown do not describe a segment of a circle since the contour thereof increases as the distance from the longitudinal center on line "B—B" increases, this increase of curvature taking place gradually as the lines approach towards the base of the said hub. It will also be noticed that the lines find their beginning parallel to and coinciding with the center of the longitudinal axis of the said hub as shown on line "B—B."

Having thus described my invention, what I claim and desire to secure by Letters Patent is as follows:

1. In an aircraft propeller having a centrally located coneshaped hub with the apex forwardly extending with respect to the normal line of flight, the profile of said hub being formed of reversely curved lines, generated at the apex thereof on a line coinciding with the longitudinal axis of the said hub and backwardly and outwardly extending, and having the curvature of said lines gradually increasing as the same approach the base thereof with propeller blades readily extending from the said base of the said hub and rotatably mounted upon the said longitudinal axis.

2. An aircraft propeller having a centrally located coneshaped hub of a profile of apposed catenary lines the said lines being generated at the apex thereof on a line parallel with the longitudinal axis from thence the said lines carry gradually increasing curvature away from the said longitudinal axis until they coincide at the base of the said hub, with propeller blades radially extending from the base of the said hub.

3. In an aircraft propeller having a centrally located coneshaped hub with its apex forwardly extending with respect to the normal line of flight, the said hub having a surface of curvilinear profile of lines of opposite generation, the said lines paralleling the longitudinal axis at the apex thereof and carrying gradually increasing curvature as the said surface proceeds gradually from the apex thereof and outwardly from the longitudinal axis until the said surface makes a juncture with the base of the said cone, and with propelling blades integrally mounted upon and radially extending from the base of the said hub and rotatably mounted upon the said longitudinal axis therewith.

4. An aircraft propeller in combination, a centrally located cone of gradually increasing relative proportions as the distance is increased from the apex thereof, a series of spiral vanes constructed upon the contour of the said cone and terminating at the base thereof, and a plurality of propelling blades constructed adjacent to and outwardly extending from and rotatably fixed upon the base of the said cone.

5. An aircraft propeller in combination, a centrally located cone having a surface formed upon a contour line generating parallel to the longitudinal axis adjacent to the apex thereof thence backwardly and outwardly extending by an accentuatingly curved line to and terminating at the base of the said cone at an angle greatly inclined towards the line of the radius drawn at right angles from the said longitudinal axis, and a plurality of spiral vanes constructed along the surface of said cone and having an increasing angle of incidence with respect to a radial line extending from the axillar center and a gradually decreasing angle of deflection with respect to the longitudinal axis until the said vanes terminate at the base of the cone and coinciding with and becoming an integral part of the radially extending propeller blades rotatably mounted upon the said cone.

6. An aircraft propeller in combination, a centrally located cone having a contour formed upon curved lines extending longitudinally with the axis thereof and terminating at the base of the cone at an angle greatly inclining towards the line of the radius drawn at right angles from the said axis, and a plurality of spirally progressing vanes constructed along the surface of said cone of gradually decreasing angle of incidence with respect to the surface of the said cone, and having a gradually increasing angle of deflection with respect to the longitudinal axis until the said vanes terminate at the base of the cone and become integral with the blades constructed adjacent to and outwardly extending from the base of said cone.

7. An aircraft propeller in combination, a centrally located cone having a profile formed upon opposingly curved lines extending from the apex backwardly towards the base of the said cone, the curve of the said lines being of gradual accentuations away from the line of the longitudinal axis and gradually and outwardly subtending towards a radial line coincident with the base of the said cone and a plurality of vanes made integrally with the said cone which are spirally mounted thereon and gradually receding from the apex of the said cone towards the base thereof along and around the contour of the said cone, the said vanes possessing gradually increasing angle of incidence with respect to the axis of the said cone and of gradually decreasing declination with respect to the axillar center of the said cone, a plurality of propeller blades extending outwardly from and adjacent to the base of the said cone, the said blades having a beginning coinciding with and at the termini of the said spiral vanes whereby the air-steam impinging upon the surface of the said cone will be gradually diverted away from the axillar center of the propeller as the said air-stream approaches the base of the said cone along the contour thereof and between the spiral vanes aforesaid, an axis operatively journalled and arranged within the hull of the aircraft to support the said propeller, and a means of rotating the said propeller by engine power.

8. An aircraft propeller in combination, a centrally located cone having a surface formed upon a curved line extending from the apex backwardly towards the base of the said cone, the said line having a curve gradually accentuated away from the line of the longitudinal axis and gradually subtending towards a radial line coincident with the base of the said cone, and a plurality of vanes made integrally with the said cone being spirally mounted thereon and gradually receding from the apex of the said cone towards the base thereof along and around with the contour of the said cone, the said vanes having a gradually decreasing angle of incidence with respect to the surface of the said cone and of gradually increasing angle with respect to the axillar center of the said cone, and a plurality of propeller blades extending outwardly from and adjacent to the base of the said cone.

9. An aircraft propeller possessing a centrally located coneshaped hub with the apex thereof forwardly extending and with a profile formed upon reversely curved lines having their generation parallel with the line of the longitudinal axis adjacent to the apex thereof and gradually extending backwardly and outwardly from the apex and from the longitudinal axis with increasing outward inclination with respect to the said longitudinal axis, a plurality of vanes constructed upon and outwardly protruding from the surface of the said hub, the said vanes having their beginning adjacent to the apex of the said hub and on lines paralleling the longitudinal axis thereof from thence the said vanes spirally retrograde backwardly and outwardly around the said coneshaped hub towards the base thereof, and during the course of such vaneous retrogressions the angle of incidence of the said vanes with respect to the longitudinal axis gradually increases until the said vanes reach the base of the said hub whereat the said vanes conjoin with propelling blades which extend outwardly from the base of the said hub.

10. An aircraft propeller having a centrally located coneshaped hub with the apex thereof forwardly extending with respect to the normal line of flight having a surface defined in profile by lines generating at the apex of the said hub and paralleling the longitudinal axis thereof and from thence reversely curving outwardly towards and terminating at the base thereof, the curvature of the said lines increasing as they progress away from the longitudinal axis; vanes outwardly protruding from the surface of the said hub, the said vanes being of spiral contour generating at the apex thereof and thence proceeding backwardly upon and outwardly around the surface of the said hub by spiral retrogressions having their contour changing with respect to the longitudinal axis as the distance therefrom is increased and their angle of incidence with respect to a radial line extending from the longitudinal axis increased as the distance from the longitudinal center is increased until the said vanes conjoin at the base of the said hub with and form a continuation in propeller blades radially extending from the base thereof at right angles to the longitudinal axis.

In testimony whereof I have signed my name to this specification.

CHARLES S. HALL.